J. TURNER.
FRICTION-CLUTCH.

No. 174,324.                                          Patented Feb. 29, 1876.

WITNESSES                                             INVENTOR

UNITED STATES PATENT OFFICE.

JOHN TURNER, OF CHICAGO, ILLINOIS, ASSIGNOR OF ONE-HALF HIS RIGHT TO ARTHUR J. O'LEARY, OF SAME PLACE.

IMPROVEMENT IN FRICTION-CLUTCHES.

Specification forming part of Letters Patent No. 174,324, dated February 29, 1876; application filed September 18, 1875.

*To all whom it may concern:*

Be it known that I, JOHN TURNER, of Chicago, in the county of Cook and in the State of Illinois, have invented certain new and useful Improvements in Friction-Clutches; and do hereby declare that the following is a full, clear, and exact description thereof, reference being had to the accompanying drawings, and to the letters of reference marked thereon, making a part of this specification.

The nature of my invention consists in the construction and arrangement of the several parts of a friction-clutch for shafting, the peculiarities of which will be hereinafter more particularly described.

Figure 1:
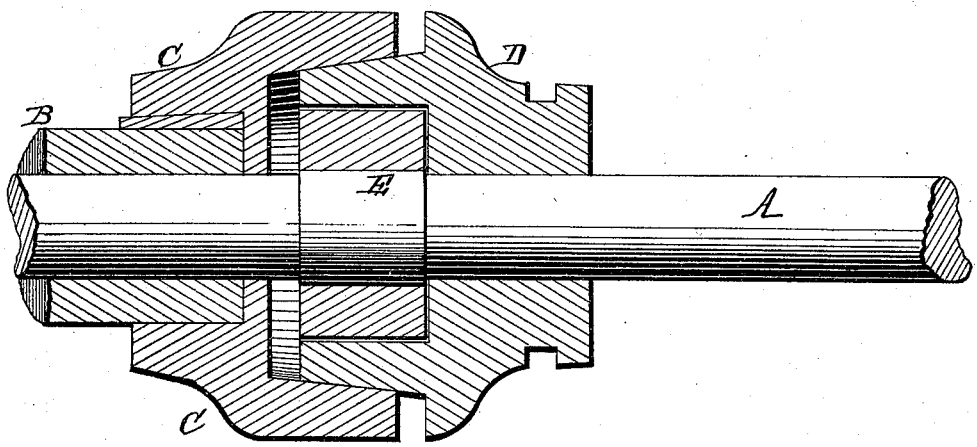
Figure 2:
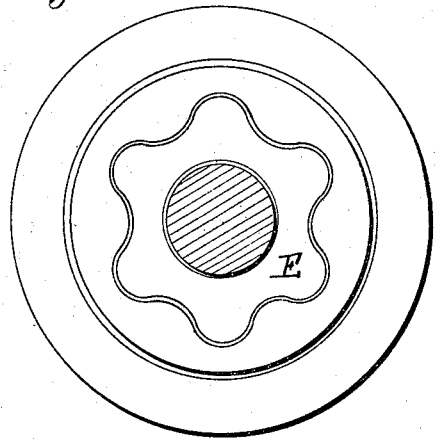

In the annexed drawings, making part of this specification, Figure 1 represents a longitudinal section, and Fig. 2 a face view, of the pinion and cone surrounding it.

In the figures, A represents the main shaft and B a hollow shaft, which slips over it for a portion of its length. Upon the shaft B is keyed a conical or flaring female clutch C. D represents a conical male clutch, which surrounds A, and which has a short movement on said shaft in the direction of its length. E represents a pinion, which is made fast upon the shaft A. The teeth of this pinion correspond with and mesh into an internal gear in the clutch D. The teeth upon these gear-wheels are made long enough, so that the clutch D may slide endwise as far as it is intended to move without said teeth becoming disengaged. When the two clutches are disengaged the shaft B is stationary.

As the male cone of clutch D is made so that it will enter a portion of its length into the female portion of clutch C, it will be seen that when the clutch D is moved up to the clutch C the male portion of the one will enter the female portion of the other, and thus by friction cause it to partake, gradually, of its motion.

I thus avoid any shock or strain to the machinery, which is liable to occur when the motion is suddenly communicated from one to the other.

Having thus fully described my invention, what I claim as new, and desire to secure by Letters Patent, is—

The two clutches C and D and the shafts B and A in combination with the toothed wheel E, the clutches being constructed and arranged in the manner herein set forth, for the purpose specified.

In testimony that I claim the foregoing I have hereunto set my hand this 7th day of August, 1875.

JOHN TURNER.

Witnesses:
 PHILO ALLEN,
 JAMES H. GILBERT.